United States Patent

[11] 3,622,768

[72] Inventors John C. Clark
Oakland;
Han Kuijsten, Oakland; Werner Schaer,
Santa Clara, all of Calif.
[21] Appl. No. 853,738
[22] Filed Aug. 28, 1969
[45] Patented Nov. 23, 1971
[73] Assignee SCM Corporation

[54] DUAL KEY DEPRESSION FOR DECIMAL POSITION SELECTION
27 Claims, 5 Drawing Figs.

[52] U.S. Cl. .......... 235/160, 235/159
[51] Int. Cl. .......... G06f 13/00
[50] Field of Search .......... 235/160, 159, 156, 61 DP, 60.15, 64.3; 340/365

[56] References Cited

UNITED STATES PATENTS

| | | | |
|---|---|---|---|
| 2,769,592 | 11/1956 | Burkhart et al. | 235/159 |
| 3,021,066 | 2/1962 | Martens | 235/160 |
| 3,308,280 | 3/1967 | Crowther et al. | 235/160 |
| 3,358,125 | 12/1967 | Rinaldi | 235/160 X |
| 3,375,356 | 3/1968 | Scuitto | 235/160 |
| 3,405,392 | 10/1968 | Milne et al. | 235/156 X |

*Primary Examiner*—Malcolm A. Morrison
*Assistant Examiner*—David H. Malzahn
*Attorney*—Armand G. Guibert

ABSTRACT: Depression of a register clear key concurrently with depression of a digit key for purposes of selection of the decimal point position in a calculating machine without decimal point selection dials, levers, etc. is disclosed.

INVENTORS
JOHN C. CLARK
HAN KUIJSTEN
WERNER SCHAER
BY
Armand G. Guibert
Agent

INVENTORS
JOHN C. CLARK
HAN KUIJSTEN
WERNER SCHAER
BY
Armand G. Guibert
Agent

INVENTORS
JOHN C. CLARK
HAN KUIJSTEN
WERNER SCHAER
BY
Armand G. Guibert
Agent

DUAL KEY DEPRESSION FOR DECIMAL POSITION SELECTION

BRIEF SUMMARY OF THE INVENTION

This invention relates to calculating machines and more particularly to the manner of selecting the decimal point position around which the numbers will be displayed and also, in fixed point machines, the position entered in a given register.

According to the prior art, this has always required special switches controlled by dials, levers or other manually set devices, adding to the cost of the equipment.

According to the invention, this selection is performed much more economically by combined use of existing keys on the keyboard of the calculating machine. Specifically the invention contemplates simultaneous use of a function key, such as the clear key, and one or more digit keys of the calculator for establishing the location of the decimal point in the machine's memory and/or display.

DETAILED DESCRIPTION

Figure 1:
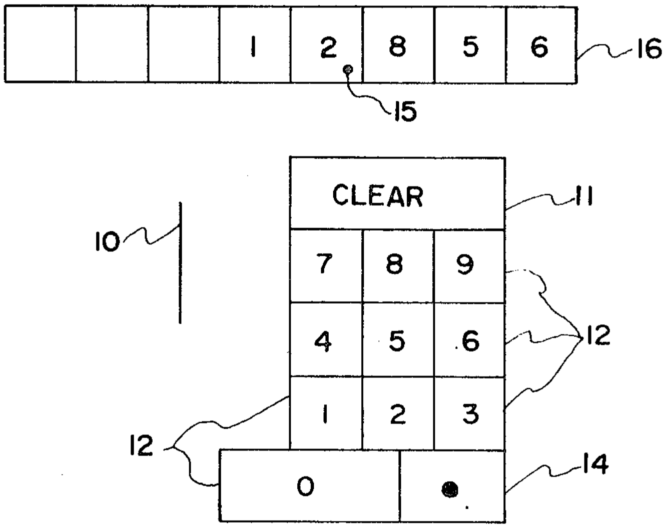
FIG. 1 shows a keyboard and a display appropriate to the invention.

Referring to FIG. 1, the description of the invention is based on a calculating machine having a clear key 11, keyboard 10, comprising ten digit keys ("0" through "9") generally identified by the reference number 12, and a decimal point key 14; together with ancillary logic and an internal storage register (not visible in FIG. 1); and a multiorder display register 16 for displaying the digits and the decimal point. If the machine is of the fixed-point variety, both for internal operations and also for display, use of the decimal point key 14 does not determine location of the decimal point insofar as display 16 is concerned, but merely determines the positions in which data are entered into the internal register and also their positions in the display —as will be seen. It will be clear, nevertheless, that the same selection approach could be used with machines having "floating-point" internal operations, but selectable "fixed-point" display.

Operationally, for example, entry of the number 12.856 into the machine, as shown by display register 16 in FIG. 1, would be achieved as follows according to the invention. Assume that the internal register is not clear initially and that the decimal point had been set just left of the second display position, i.e., to the right of the third display position, such that the result displayed in register 16 was a number having, say, hundreds, tens, units, tenths, and hundredths values. The operator would depress clear key 11 simultaneously with depression of the number "3" digit key 12 in keyboard 10. According to the invention, this action would result in clearance of the internal register (described subsequently) and display of a zero in the fourth ordinal position of display register 16, together with display of a decimal point 15 in that same ordinal position, and zeros in the three decimal fraction positions to the right of decimal point 15. Upon depression of the "1" decimal digit key 12, the digit would be entered and the display would then show the figure "1" entered in the fourth order, that is, the units decimal position according to the new decimal point setting. Next, the operator would depress the "2" decimal digit key 12 and display register 16 would then show the "1" entry left shifted to the fifth ordinal position of register 16 with the "2" displayed in the adjacent position to the right — namely, the fourth ordinal position formerly occupied by the "1". Upon depression of decimal point key 14 which would follow thereafter, neither of the two digits previously entered would be left shifted and the decimal point 15 would now be displayed adjacent the right-hand side of the "2" in the fourth ordinal position of display register 16. Subsequent depression of the "8" decimal digit key 12 would result in display of the figure "8" in the ordinal position to the right of that occupied by the figure "2" in display register 16, similar actions resulting upon depression of the next two decimal digits keys 12 by the operator, namely, the "5" and the "6" keys 12, as shown in FIG. 1.

Figure 5:
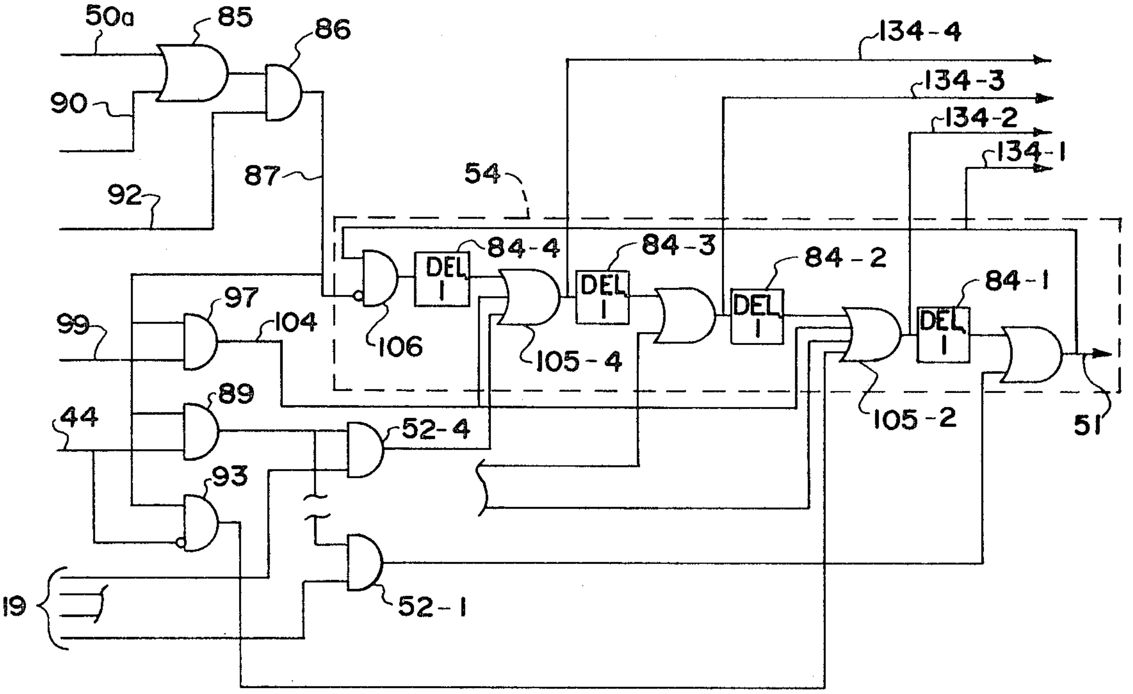
FIG. 5 is a logic diagram of the decimal point location selection according to the invention.
Figure 2:
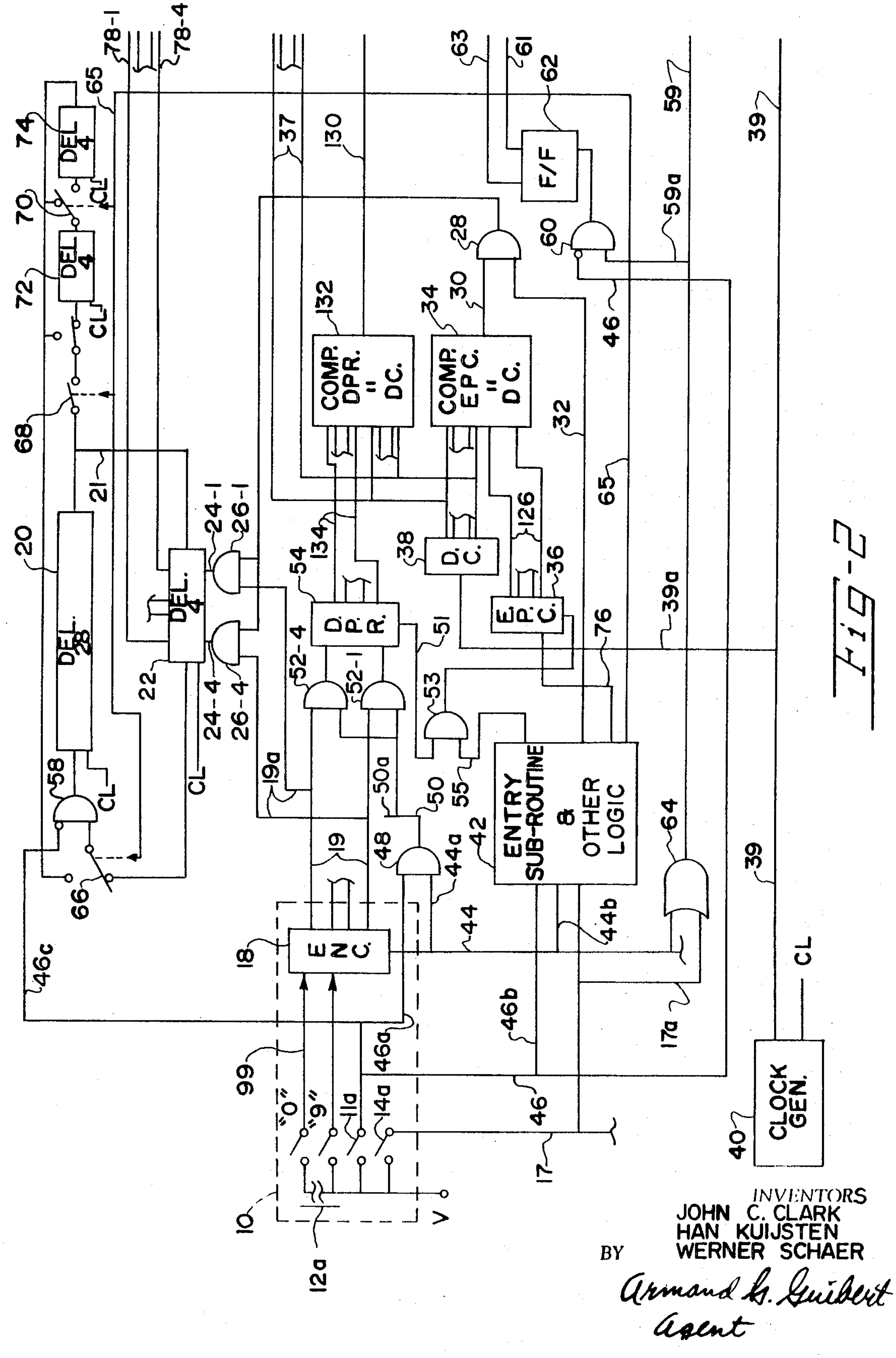
FIG. 2 is a block diagram of elements necessary to the invention other than the display.

Structure for accomplishing the above is shown in FIG. 2, the disclosed embodiment being a machine of the "fixed-point" variety. Here the keyboard 10 is shown to include an encoder 18 in addition to key switches 11*a*, 12*a*, and 14*a*, operable by depression of the associated keys to close circuits to a voltage source (not shown) in known fashion. Encoder 18 is used for converting the voltage signal produced by an individual digit key 12 depression and appearing on a single one of ten inputs to encoder 18. The single signal is preferably converted into four-coded bit signals available in parallel. Encoder 18 may be a diode matrix of the type described in Chapter 2 "Diode Switching Circuits", of "Digital Computer Components and Circuits", by R. K. Richards, D. Van Nostrand & Co., 1957, this book being referred to hereinafter as the "Richards No. 1" reference. Depression of any of the digit keys 12 or decimal point key 14 must result in a storage of a corresponding code in an appropriate position of a register or registers. In FIG. 2, the digital information is shown to be stored in a shift register 20, preferably having a multidigit capacity at least as large as display register 16 of FIG. 1 with the exception that one digit may be stored in an auxiliary register 22 forming part of the circulation path for register 20. The registers 20 and 22 may be units such as the dynamic shift registers shown in the section "Shifting Registers" of Chapter 5 "Binary Multiplication and Division" of "Arithmetic Operations in Digital Computers" by R. K. Richards, published by D. Van Nostrand Company in 1955, this reference hereinafter being termed "Richards No. 2." A dynamic shift register similar to register 22 is shown in FIG. 5, discussed subsequently. Register 20 may also be a sonic delay line or a magnetic drum with a revolver. It will be recognized that still another alternative would be to have a magnetic drum register with a one-digit static shift register, that is, a buffer register, in place of dynamic register 22—similar to structure in assignee's Pat. No. 3,265,874, invented by W. Soule, Jr., et al.

The decimal point key depression is stored in a flip-flop 13, flip-flops being well-known bistable devices — examples being given in Richards No. 1 and No. 2, for instance.

To match the eight-order display register 16 of FIG. 1, register 20 should have at least seven digit positions, an eighth digit being stored in dynamic register 22, as mentioned previously. For purposes of entering information, the one-digit storage comprised by register 22 may be a dynamic shift register (similar to that described subsequently with reference to FIG. 5, as mentioned previously) or a short-tapped delay line of a type well-known in the prior art, there being four taps 24 located at one-bit delay intervals along its length, in known fashion. Each of the taps 24 is connected to a respective one of four output lines 19*a* from encoder 18—namely, that of corresponding weight in the coded decimal form used, preferably the 1–2–4–8 binary coded decimal code. This connection occurs through a corresponding one of And gates 26–1 to 26–4, each of these And-gates 26 having as a second input a signal from another And-gate 28 which has two input lines 30 and 32. Input line 30 comes from a comparator 34 constructed according to any one of the techniques described under "Miscellaneous Operations — Comparison" in the Richards No. 2 reference. Comparator 34 samples the outputs of an "entry position counter" 36 and a digit counter 38, each of which is shown here as having, for example, a four-bit capacity in order to permit identification of the assumed eight digit positions of the combined registers 20 and 22.

According to our disclosed embodiment, digit counter 38 will have a count of zero when the least significant digit has its four bits at the right-hand end of register 20, i.e., just prior to being shifted into the tapped auxiliary register 22. At that time, of course, the bits of the most significant digit will be stored in register 22. Digit counter 38 is operated by "digit time" signals, a clock generator 40 providing clock pulses "CL" with a period equal to the delay time of register 20 divided by $4n$ where $n$ is the number of digits of its capacity, the factor four reflecting the presence of four bits in each digit. (The period is also equal to the delay time of register 22 divided by four, of course.) The "digit time" signals operating counter 38 are generated every fourth clock pulse, corresponding to one digit.

The entry position counter 36 will contain bits of information corresponding to the selected fixed decimal position during digit entry before depression of the decimal point key 14, and values less than this at subsequent times, as will be described.

Figures 3, 4:
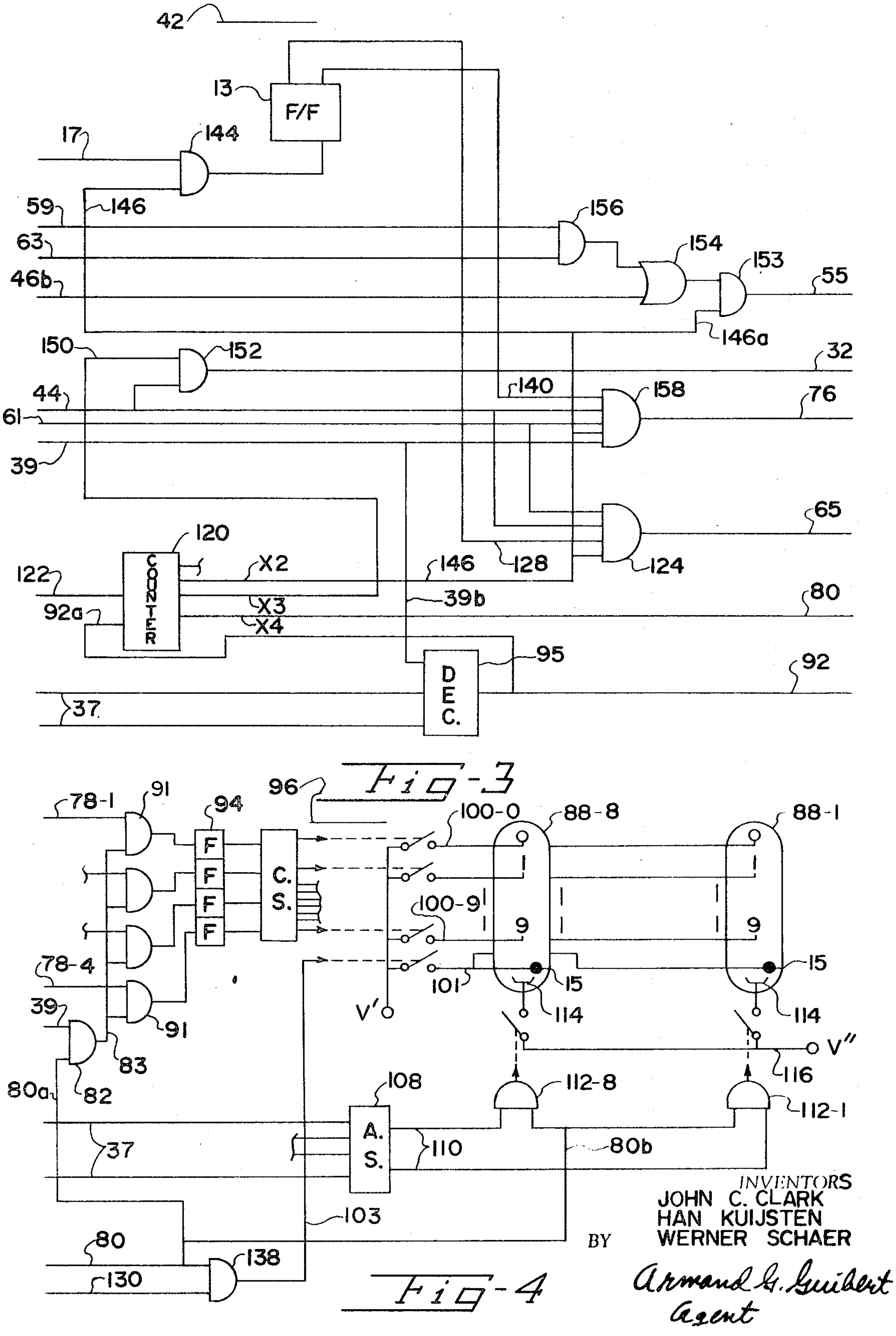
FIG. 3 is a block diagram expanding a control block shown in FIG. 2.
FIG. 4 is a combined block and logic diagram of a display associated with the invention.

The other input to And-gate 28, namely that on line 32, comes from a block 42 which is labeled "Entry Subroutine and Other Logic," more fully detailed in FIG. 3. The line 32 carries a control signal, referred to as "DGT→K(EPC+1.") This signal establishes the fact that (and occurs when) everything has been prepared for entering into register 20,22 the bits corresponding to the value of the digit key 12 which was depressed, as will be described. When register 20,22 is clear, entry can occur almost immediately whereas under other circumstances—namely, after one or more digit keys 12 have been depressed, or the decimal key 14 has been depressed—certain preliminary operations are required in the subroutine. These operations are the left shifting of register 20,22 for each depression of a digit key 12 occurring prior to depression of a decimal key 14 and the decrementing of entry position counter 36 for each depression of a digit key 12 which occurs subsequent to depression of decimal key 14, as will be described in fuller detail hereinafter.

Having described the major components (except for display 16, covered later), consider first the operation of the clear key in the example chosen. When clear key 11 is depressed simultaneously with one of the digit keys 12, a signal will be present (refer to FIG. 2) on a line 46 indicating that clear key 11 has been depressed and another signal will be present on a line 44 to indicate that a digit key 12 (the "3" key according to the example) has been depressed at the same time. These two signals fed to an And-gate 48 will give rise to an output signal (termed "CA" hereinafter) on line 50, which line is an input on each of a series of four And-gates 52–1 to 52–4 controlling passage of parallel bit signals corresponding to the code of the digit key 12 depressed, these bit signals appearing on the output lines 19 of encoder 18, as mentioned previously. The outputs of And-gates 52–1 to 52–4 are supplied in parallel to the related positions of another four-bit dynamic shift register 54 (a more detailed drawing of this register is given as FIG. 5) which thus stores the code for the selected value of the decimal point position.

The signal from clear key 11 on line 46 also goes to the logic block 42 via a line 46*b* for reasons described later. For clearance purposes, a line 46*c* is connected to the inhibit input of a two-input inhibit gate 58, the other input of which connects with the output of four-bit register 22, and the output of gate 58 being connected to the input of register 20. Such use of an inhibit gate for purposes of clearance is well known, see for instance the section on "Delay Line Storage" in the chapter on "Large Capacity Storage: Non-Magnetic Devices" of the Richards No. 1 reference. The signal on line 46*c* must be present at the inhibit input of this gate 58 for a time corresponding to the full capacity of register 20 and that of auxiliary register 22 to insure complete clearance of the contents of combined register 20,22. To this end, a flip-flop (not shown) set for one complete cycle of counter 38 would be suitable as a control, in known fashion.

At this point, according to the example, registers 20 and 22 have a zero content in all positions and shift register 54 now stores the "3" code for controlling display of the decimal point just to the right of the fourth ordinal position, that is, between the third and fourth ordinal positions, as shown for the decimal point 15 in FIG. 1. The code for the "3" key 12 depressed will not have been entered into register 22 because And-gates 26–1 to 26–4 previously mentioned will be closed, i.e., will not permit passage of the signal since there will have been no enabling output from And-gate 28. Thus, display register 16 will show a zero in the fourth ordinal position, together with the decimal point and also zeros in the three ordinal positions to the right of the decimal point. The means for controlling the display of the zeros and the decimal point will not be discussed at this point, but deferred until discussion of FIG. 4.

Considering next what transpires upon depression of the "1" key 12, this key being depressed alone initiates what is termed an "Entry Subroutine", the first step of which is a preclearance of register 20,22 performed, say, by means of gate 58 and inhibit input 46*c* mentioned previously. This step is not necessary in the example chosen and is not essential to the invention, so structure to provide it will not be described, such being well-known though. The next step is the transfer of the contents of register 54 to counter 36. This transfer occurs in serial fashion by gating the contents of register 54 through a line 51 to the input of the entry position counter 36, through a two-input And-gate 53 having a line 55 from the Entry Subroutine block 42 as its other and controlling input. The origin of signals on line 55 will be discussed later. Flip-flop 13, used to indicate depression of decimal point key 14, may be reset at this time also, if not reset previously. Furthermore, by means of line 44, the digit signal will be supplied to an Or-gate 64 and pass through it via lines 59 and 59*a* to one input of an inhibit gate 60 having as the inhibit input, the "clear" signal supplied from line 46. Since clear key 11 was not depressed with the "1" digit key 12 in this instance, the inhibit signal will be absent and a signal will pass through gate 60 to the "Set" input of a flip-flop 62 used to mark the beginning of a new entry, that is, to remember that at least one digit of a new number (or a decimal point if the new number is a decimal fraction) has been entered.

The next step in the entry subroutine initiated by depression of the "1" key 12 is the generation of the entry-controlling signal "DGT→K(EPC+1," which signal is generated in the block 42 of FIG. 2 and supplied on line 32 to condition And-gate 28 for passage of an enabling signal for And-gates 26–1 to 26–4 when a signal from comparator 34 appears on line 30 to indicate that the value in the entry position counter 36, previously set equal to the contents of register 54 (i.e., the value "3" in this example) matches the content of digit counter 38. Recalling that counter 38 has a count of zero when the bits of the least significant digit are at the right-hand end of register 20, it will be evident that the identity signal between digit counter 38 and entry position counter 36 will be generated by comparator 34 at a time when data in the fourth ordinal position are at the right-hand end of register 20. the input to And-gate 28 on line 32 is made only upon occurrence of the "digit" or fourth bit time signal from clock generator 40, the identity signal will thus be present only after the bits of the fourth ordinal position have been shifted into auxiliary register 22. Hence, at the fourth bit time the bit signals 0–0–0– 1 present on lines 19*a* and corresponding to the "1" key 12, will pass through gates 26–1 to 26–4 and into register 22 via the interconnections 24–1 to 24–4.

Entry of the second digit of the example, by depression of the "2" digit key 12 results in a somewhat different series of steps. Flip-flop 62 having been set as a result of earlier depression of a digit key 12, and flip-flop 13 not being set because decimal point key 14 has not yet been depressed, logic block 42 generates—in a manner to be described subsequently—first a signal to produce a left shift in register 20, the signal to produce this left shift appearing on a line 65 in FIG. 2. The appearance of a signal on line 65 causes transfer of switches 66, 68, and 70, transfer of the first of these three—namely, 66—resulting in the loss of the bits (zeros in this instance) of the most significant digit position, those in register 22. The contents of register 20 are thus circulated in an entirely different path, namely, that through two-short shift registers 72 and 74 which may be identical to register 22 except for the absence of taps. The addition of the extra four-bit delay 74 relative to that previously present causes the contents of register 20 to be shifted left by one position, i.e., the "1" entered into the fourth ordinal position will now appear in the fifth ordinal position. The next step in the routine provides for generation of the signal on line 32 (previously described) to enable entry of the bits corresponding to the value of the key depressed, the "2" digit key 12 in this instance, by conditionally enabling And-gate 28. As a result, when comparator 34 indicates identity of the contents of entry position counter 36 and digit counter 38, a signal on line 30 will occur, as before, when the fourth ordinal position of register 20 is present at the right-hand end of register 20. Because the signal on line 32 occurs at the end of the fourth-bit time, as previously described, the 0–0–1–0 code signals on line 19*a* corresponding to the "2" key 12 depressed, will pass through And-gates 26–1 to 26–4 via associated connection lines 24–1 to 24–8 into four-bit register 22 at the correct time for storage in the fourth ordinal position, (and display at that position, as will be described later).

For the example, chosen, the next operation is the depression of decimal key 14, which results in setting flip-flop 13 via line 17 from switch 14*a*, see FIG. 3. No other actions will take place.

Depression of the third digit key of our example, that is, the "8" digit key 12, causes a further change in the subroutine since it is a digit key depression occurring after depression of decimal point key 14. In the presence of a digit signal on line 44, together with the set state of flip-flop 62, entry subroutine block 42 dispenses with the left-shift step and generates a signal on line 76 which causes entry position counter 36 to be decremented by a value of "1" before the next step of generating a signal on line 32 for purposes of digit entry as previously described. Because entry position counter 36 has a value one less than before and because no left shift has occurred, comparator 34 will give the identity signal when the third ordinal position of the contents of register 20 is at the right-hand end of that register with the result that And-gate 28 will give its enabling signal at the fourth-bit time following and allow entry of the 1–0–0–0 code for the value "8" through gates 26–1 to 26–4 via lines 24–1 to 24–4 into register 22, as previously described, but now in the third ordinal position of register 20. Entry of the 37 5" and the "6" digits of the example will take place as described immediately above for the "8" digit, conditions for these being the same and the entry in progressively rightward positions being controlled by an initial decrementation of the digit position counter 36 from the value "2" to a value "1" and from that value to zero in the corresponding entry subroutines.

With respect to the entry subroutine, logic block 42 for generation of signals on lines 32, 55, 65, and 76, previously mentioned in connection with description of FIG. 2, will now be described in detail in reference to to Fig. 3. There it will be seen that a state counter 120 is used for control of machine sequences in known fashion. When a signal appears on digit line 44 indicating depression of a digit key 12 and the state or sequence counter 120 arrives at a state X3 (timed by a signal WE appearing on a line 92 and generated at the fourth-bit time of the highest digit count of counter 38 through a decoder 95, timed by the "digit time" signal on line 39*b*) with a resultant output on line 150, then through an And-gate 152 a signal will pass to output line 32. It will be recalled that appearance of the signal on line 32 controls entry of digits into memory via And-gate 28 and related And-gates 26–1 to 26–4 when a signal on the second input to gate 38—namely, line 30—indicates that comparator 34 has detected identity of the values in entry position counter 36 and digit counter 38.

As mentioned previously, transfer of the contents of decimal point register 54 to entry position counter 36 is controlled by an And-gate 53 having as one input a line 55 from entry subroutine block 42. As seen in FIG. 3, line 55 is the output of an And-gate 153 having two inputs, one a line 146*a* connecting to line 146 from the state counter 120 and having a signal on it when state counter 120 is in a state X2. The other input to gate 153 is the output of an Or-gate 154 having two inputs, one a line 46*b* connected via line 46 to clear key switch 11*a* and having a signal when clear key 11 is depressed. The other input to Or-gate 154 comes from a two-input And-gate 156, one input being connected to line 59 (the output of Or-gate 64 which passes a signal whenever a digit key 12 or the decimal key 14 has been depressed) and the other input being a line 63 from the reset side of flip-flop 62 (which marks a new entry—i.e., whether either a digit key 12 alone or the decimal key 14 has been depressed previously subsequent to completion of any arithmetic operation). Thus, a signal appears on line 55 upon depression of a key-defining entry of new data—i.e., depression of a digit key 12, corresponding to the first digit of a whole number to be entered, or depression of decimal key 14 when the number to be entered is a decimal fraction. These depressions must occur, of course, without concurrent depression of clear key ll. Flip-flop 62 is reset (structure not shown in FIG. 2, but well known—see assignee's U.S. Pat. No. 3,265,874, previously mentioned) upon completion of any operation. Therefore, as described above in connection with FIG. 3, a high level on line 63—the reset output of flip-flop 62—will enable a signal on line 59 to pass through the previously described gates to produce the desired signal on line 55. The signal on line 59 indicates that a digit key 12 or decimal key 14 has been depressed, it will be remembered.

For left shifting register 20, a signal is produced on line 65 via gating and timing circuits also shown in FIG. 3. The left shifting occurs when the second and subsequent digits of a new number—prior to the decimal point, though—are to be entered. Accordingly, the left-shift signal on line 65 is the output of a four-input And-gate 124. Three of the four inputs are connected to lines 44, 61, and 146, respectively having a high input when a digit key 12 has been depressed, flip-flop 62 has been set, and state counter 120 is in state X2. The fourth input is connected to the reset side of flip-flop 13 by a line 128. This last input insures that the left shifting can only occur prior to depression of decimal key 14.

Lastly, the "Decrement" signal on line 76, mentioned previously in connection with entry of digits subsequent to depression of decimal key 14, is shown in FIG. 3 to be the output of five-input And-gate 158. One input to gate 158 is the line 39, which comes from clock generator 40 and supplies a signal at the fourth bit time, as explained previously, while another input is tied to line 140 coming from the set output of decimal point flip-flop 13. Flip-flop 13 is set through an And-gate Gate 144 having as its two inputs a line 17 from the decimal key switch 14*a* and a line 146 from the state counter output X2. As a result, when depression of decimal key 14 provides a signal on line 17 and at the proper state of counter 120, flip-flop 13 will be set, thus giving rise to a level on line 140 to indicate that decimal key 14 has been depressed.

A third input to gate 158 is connected to line 44, the output from encoder 18 which marks depression of any one of the digit keys 12. The fourth input is connected to line 61 which is the output on the set side of flip-flop 62, the "New Entry" flip-flop which marks the fact that there has been at least one depression of a digit 12 or the decimal key 14, this depression having occurred subsequent to completion of an arithmetic operation and without concurrent depression of clear key 11, as mentioned previously.

Display of the entered information will now be described in reference to FIG. 4. Broadly speaking, counter 38 is used to display successive digits from register 20 on corresponding known 11-element (10 digits and a decimal) cathode glow display tubes 88–1 to 88–8, forming eight-order display register 16 of FIG. 1. The general technique used is that known as "anode scanning dynamic display" and described in detail in "Cold cathode numerical indicator tubes: operating principle, behaviour and applications" by D. J. G. Janssen, A. G. Korteling, and P. H. G. van Vlodrop, published by N. V. Philips' Gioeilampenfabrieken, Eindhoven, The Netherlands Sept. 30, 1968. In brief, after the entry subroutines have been completed and whether or not the depressed key or keys have been released, the logic 42 shown in FIG. 3 will produce a level on lines 80 and 80*a*, the latter being one input to an And-gate 82 having as its other input the line 39 representing the "-digit time" output of clock generator 40. Accordingly, when a level is present on line 80*a*, a signal will pass through And-gate 82 at digit time.

The bits of information in dynamic register 22 are available in parallel on lines 78–1 to 78–4, connected to respective inputs of four two-input And-gates 91 and enabled by a signal appearing on the other inputs, which are connected in common to the output 83 of And-gate 82. The bits in register 22 will thus be transferred to and stored in a group of flip-flops 94. Through a cathode selector 96, the outputs of flip-flops 94 switch a voltage V' (supply not shown) to one of 10 lines 100–0 to 100–9, each connected in parallel to all similarly valued numeric cathodes of the tubes 88–1 to 88–8. For decimal point display, cathode voltage V' will be supplied on a line 101 to the decimal point cathodes 15 of these same tubes and similarly switched by means of a line 103 from a decimal point display control described later.

To permit only a desired one of the tubes 88–1 to 88–8 to display the digit corresponding to the cathodes provided with voltage under control of the code in flip-flops 94, counter 38 operates through an anode selector 108 to supply a counter-potential V" sequentially to each anode 114 of tubes 88 for one digit time. Anode selector 108, therefore, produces a signal on a single one of eight lines 110, each connected to a respective two-input And-gate 112, the output of each gate 112 controlling a switch connecting a line 116 from the supply of voltage V" (not shown) to the anode 114 of a respective tube 88. The other inputs to And-gates 112 are connected in common to a line 80*b* on which is provided a control signal from state counter 120 (see FIG. 3).

The state counter signal, termed X4, relates specifically to display controls. Transition of state counter 120 to state X4 is determined by a signal on line 122, present whenever a subroutine producing modifications in the stored data is not in effect (logic for generating this signal is not shown, but is of the known electronic interlock type). With counter 120 at state X4 to begin display, the level on line 80 will be supplied to And-gates 112 via interconnection 80*b*, to enable these gates and provide the counter-potential V" on the anode 114 of a selected tube 88, causing the cathode element supplied with potential V' via one of the lines 100 to glow and thus display the character stored in flip-flops 94, as is well known.

At digit clock time, the next higher digit available in register 22 will be transferred into flip-flops 94 by appearance of the digit time signal on line 39. At the same instant, the value in digit counter 38 will be incremented by one, selecting the next higher tube 88 for display through anode selector 108, in the manner described. This process will continue unchanged until time for decimal display. Then, see FIG. 2., a signal will appear on a line 130 which line is the output of a comparator 132 (identical to comparator 34) having as inputs the parallel coded output of the decimal point register 54, this output appearing on lines 134, and the similar output lines 37 of digit counter 38. When the values in register 54 and counter 38 agree, the signal "DC=DPR" will be supplied to a two-input And-gate 138 (FIG. 4) via line 130. With counter 120 (see FIG. 3) in state X4, there will be an output on line 80 as before, but note that line 80 is the second input of And-gate 138 (see FIG. 4). Under these conditions, a signal appearing on line 130 will also appear at the output of And-gate 138 and via line 103 will cause the potential V' to be present on line 101. This potential, though supplied to all decimal point cathode elements 15, will cause a glow to appear only on the decimal cathode element 15 of that tube 88 which has counter-potential V" supplied to its anode 114, as above described.

FIG. 5 shows the structure of decimal point register 54 together with modified logic permitting the setting of decimal point register 54 to a preselected value when the machine is turned on. Turning the machine on gives rise to an "Automatic Initial Clearance" or "AIC" signal, and according to a further aspect of the invention, this signal is applied to the decimal point register storage circuit at the same point as is the "CA" signal on line 50*a* and would thus be indistinguishable from the latter signal except for modified structure, described below.

As shown in FIG. 5, decimal point register 54 may be a dynamic register comprising a series of four one-bit delays 84 interspersed with a like number of OR-gate 105, each gate having at least two inputs: one connected to a preceding delay 84, another connected to a corresponding one of the And-gates 52–1 to 52–4, previously described, which control passage of signals on lines 19 from the output of encoder 18. The output of each OR-gate 105 is in turn connected to a succeeding one of the one-bit delays 84, except for the last OR-gate 105–1 which has its output fed back through an And-gate 106 (described later) to the initial one-bit delay 84–4. The output of the last OR-gate 105–1 is, of course, also connected via And-gate 53 to entry position counter 36, as previously mentioned.

When a signal appears on the CA line 50 (FIG. 2)—indicating concurrent depression of clear key 11 and one of the digit keys 12—that signal will pass via 50*a* (FIG. 5) through OR-gate 85 to an And-gate 86 which will open when the signal WE, marking the end of the last word in register 20, appears on line 92. Upon occurrence of this latter signal, gate 86 will pass a signal via line 87 to a two-input And-gate 89 having as its other input the line 44 from encoder 18 on which a signal appears whenever a digit key 12 has been depressed. Accordingly, under the circumstances of a concurrent depression, a signal will pass through gate 89 to enable And-gates 52–1 to 52–4, previously described, thus storing appropriate bits in register 54 in parallel via respective ones of the OR-gates 105 of that register.

If, on the other hand, the turning on of the machine has given rise to a signal on AIC line 90—by means of an output from, say, a capacitor charge circuit in well-known fashion—that signal will pass through OR-gate 85 and at the appropriate time, as described above, through And-gate 86 and line 87 to another two-input And-gate 93 which has as its other input an inhibiting input connected to line 44. Thus, in the presence of a digit signal, gate 93 will be closed and no signal will pass through it. Because the automatic initial clearance is the result of operating the power switch on the machine, a signal on line 90 will not be accompanied by a signal on line 44 and, accordingly, gate 93 will be open in that instance and the signal will pass to the four-input OR-gate 105–2 of register 54, connected to the second-bit delay 84–2. The output of OR-gate 105–2 presents the bit of weight 2 on the corresponding output line 134 of register 54 at digit time. With the foregoing structure, it is evident that upon turning the machine on, the decimal point register will automatically be set at "2" so as to allow entries and display with two decimal positions to the right of the decimal point.

Up to this point, it has been assumed that the contents of decimal point register 54 are set at a value identical to that of the digit key 12 depressed. However, in machines larger than the example chosen, specifically machines having capacities of at least ten digits, depression of the zero key 12 simultaneously with depression of clear key 11 can be used to enter a value of ten into register 54, as shown in FIG. 5, the structure for this comprising yet another And-gate 97 enabled by a signal on line 87. Upon depression of the 0 digit key 12, the corresponding one of the switches 12*a* will be closed sending a signal via line 99 which will pass through enabled gate 97 to give an output on line 104. This latter line is connected to OR-gate 105–2, previously mentioned, and to Or-gate 105–4, both in register 54. The output of OR-gate 105–4, gives rise to a signal on the eight-weight output line 134 of register 54. The combination of the signals from these two OR gates is the 1–2–4–8 BCD code for a ten, as is obvious.

With respect to machines of larger capacity, it is also evident that if keyboard 10 does not have the digit keys 12 interlocked, either mechanically or electronically, then depression of clear key 11 concurrently with two-digit keys 12 can be used to set register 54 to a value between ten and sixteen by virtue of entering combined bits of the corresponding 1–2–4–8 BCD codes into register 54 through the respective OR -gates 105–1 to 4 shown in FIG. 5. As another alternative for the larger machines, it is intended that the scope should include storage in decimal point register 54 of data which is not equal to but related, as by a constant factor, to the value of the digit key 12 depressed concurrently with clear key 11. For example, by merely left shifting the BCD code bits in register 54, as part of the storage routine, the code stored would be effectively twice the value of the key depressed. For smaller machines, although not preferred, it is obvious that simultaneous depression of, say, the "0" digit key together with any other digit key could be used to select a decimal point position related to the value of the latter digit key.

It should be noted that as long as a signal is present on line 87, the output of register 54 cannot be fed back to its input because of the presence of gate 106. Gate 106 has two inputs, one of which is connected to the output of register 54 and the other of which is an inhibiting input connected to line 87. Therefore, the presence of a signal on line 87 will prevent recirculation of information emerging from register 54. In this respect, gate 106 operates in a fashion identical to that of gate 58, previously described in connection with clearance of dynamic register 20.

From the foregoing description, it is evident that structure has been presented for storing decimal position data related to the value of one or more digit keys 12 when these are depressed concurrently with a clear key 11, the stored information being utilizable—upon subsequent depressions of digit keys 12 independently of clear key 11—to control entry of the values corresponding to these digit keys 12 into a fixed position of a register, previous entries first being shifted left on each entry until such time as a decimal point key 14 is depressed. After depression of the decimal point key 14, further depression of digit keys 12 results in entry of the corresponding values into progressively rightward positions of the register. The stored information can also be used to control display of properly pointed off results aligned with a preselected decimal point display position.

In light of the above-described embodiments, it will be evident to those skilled in the art that the present invention is susceptible of other modifications, substitutions, etc. and such are intended to be within the scope of the invention, it being defined only by the appended claims.

We claim:

1. In a calculating machine having a plural-position register for storing data, the improvement comprising a. a plurality of data entry keys, b. storage means for radix point information, and c. means responsive to concurrent depression of at least two of said keys to store in said radix point storage means information defining the radix point location and being determined by at least one of said keys.

2. A calculating machine as defined in claim 1, wherein said data entry keys comprise a keyboard having value keys and a special key, and said storing means are responsive to concurrent depression of said special key and at least one of said value keys.

3. A calculating machine as defined in claim 2 and further including means for sensing said radix point information, and means for entering data in said plural-position storage register at positions controlled by said radix point information sensing means in response to operation of said value keys.

4. A fixed radix point calculating machine as defined in claim 3, wherein said value keys are decimal digit keys and said radix point location information stored is related to the decimal value of the digit key depressed.

5. A fixed decimal point calculating machine as defined in claim 4, wherein said digit key depressed has the value "0" and said decimal point location information corresponds to the value "10."

6. A calculating machine as defined in claim 2, wherein said special key is a clear key and including means responsive to depression of said clear key to clear the contents of said register.

7. A calculating machine as defined in claim 6, together with at least one other plural-position storage register, depression of said clear key alone causing clearance of said first-mentioned register and depression of said clear key concurrently with depression of one of said digit keys additionally causing clearance of said other storage registers.

8. A calculating machine as defined in claim 2, wherein said special key is depressed concurrently with depression of at least two of said plurality of value keys and said means responsive to concurrent depression of said keys stores information related to a combination of the values of said depressed value keys.

9. A calculating machine as defined in claim 8, wherein said special key is a clear key and including means responsive to depression of said clear key to clear the contents of said register.

10. A calculating machine as defined in claim 2, wherein said machine is operable by a normally disabled source of power, together with means enabling said source of power; and further including means responsive to said enabling of said source of power and operable to cause said concurrent depression responsive means to store a predetermined value in said radix point storage means.

11. A calculating machine as defined in claim 10, wherein said enabling means is a switch settable to a power-on position, and said concurrent depression responsive means stores a "2" in said radix point storage means in response to the setting of said switch to said power-on position.

12. A calculating machine as defined in claim 1, and further including a device having a plurality of positions for displaying data from said register, and means to display a radix point at one of said display positions under the control of said stored radix point information.

13. A calculating machine as defined in claim 12, wherein said data entry keys comprise a keyboard having value keys and a special key, and said storing means are responsive to concurrent depression of said special key and at least one of said value keys.

14. A calculating machine as defined in claim 13, wherein said value keys are decimal digit keys and said radix point location information stored is related to the decimal value of the digit key depressed.

15. A calculating machine as defined in claim 13, wherein said special key is a clear key and including means responsive to depression of said clear key to clear the contents of said register.

16. A calculating machine as defined in claim 15, together with at least one other plural-position storage register, depression of said clear key alone causing clearance of said first-mentioned register and depression of said clear key concurrently with depression of one of said value keys additionally causing clearance of said other storage registers.

17. A calculating machine as defined in claim 13, wherein said special key is depressed concurrently with depression of at least two of said plurality of value keys and said means responsive to concurrent depression of said keys stores information related to a combination of the values of said depressed value keys.

18. In a calculating machine having a keyboard, including value keys for data entry, a plural-position register for storing data, and a device displaying the contents of said register, the improvement comprising a. a special key on the keyboard, and b. means to display the location of a radix point with respect to said contents, said radix point display means being responsive to concurrent depression of said special key and at least one of said value keys to display said radix point at a location related to the value of said depressed value key.

19. A calculating machine as defined in claim 18, wherein said value keys are decimal digit keys and said radix point display location is related to the decimal value of the digit key depressed.

20. A calculating machine as defined in claim 19, wherein said register and said display each have at least ten positions, said digit key concurrently depressed has the value "0" and said decimal point display means in response to said concurrent depression displays a decimal point to the left of said tenth display position.

21. A calculating machine as defined in claim 19, wherein said special key is a clear key and including means responsive to depression of said clear key to clear the contents of said register.

22. A calculating machine as defined in claim 21, further including means for storing radix point location information in response to said concurrent depression and means for sensing said stored radix point information, and wherein said radix point display means are controlled by said sensing means.

23. A calculating machine as in claim 22, and further including means responsive to depression of said clear key to display zeros representing the contents of said cleared register, and to display a decimal point at a location under control of said radix point location information, and responsive to the concurrent depression of said clear key and at least one said digit key to display zeros representing the contents of said cleared register and a decimal point at a location determined by the value of said digit key.

24. A calculating machine as defined in claim 18, further including means for storing radix point location information in response to said concurrent depression and means for sensing said stored radix point information, and wherein said radix point display means are controlled by said sensing means.

25. A calculating machine as defined in claim 24, further including means for entering data in said plural-position storage register at positions controlled by said sensing means in response to operation of said value keys in the absence of concurrent operation of said special key.

26. A calculating machine as defined in claim 18, wherein said machine is operable by a normally disabled source of power, together with means enabling said source of power; and further including means responsive to said enabling of said source of power and operable to cause said concurrent depression responsive means to store a predetermined value in said radix point storage means.

27. A calculating machine as defined in claim 26, wherein said enabling means is a switch settable to a power-on position, and said concurrent depression responsive means stores a "2" in said radix point storage means in response to the setting of said switch to said power-on position.

* * * * *